Patented Aug. 11, 1925.

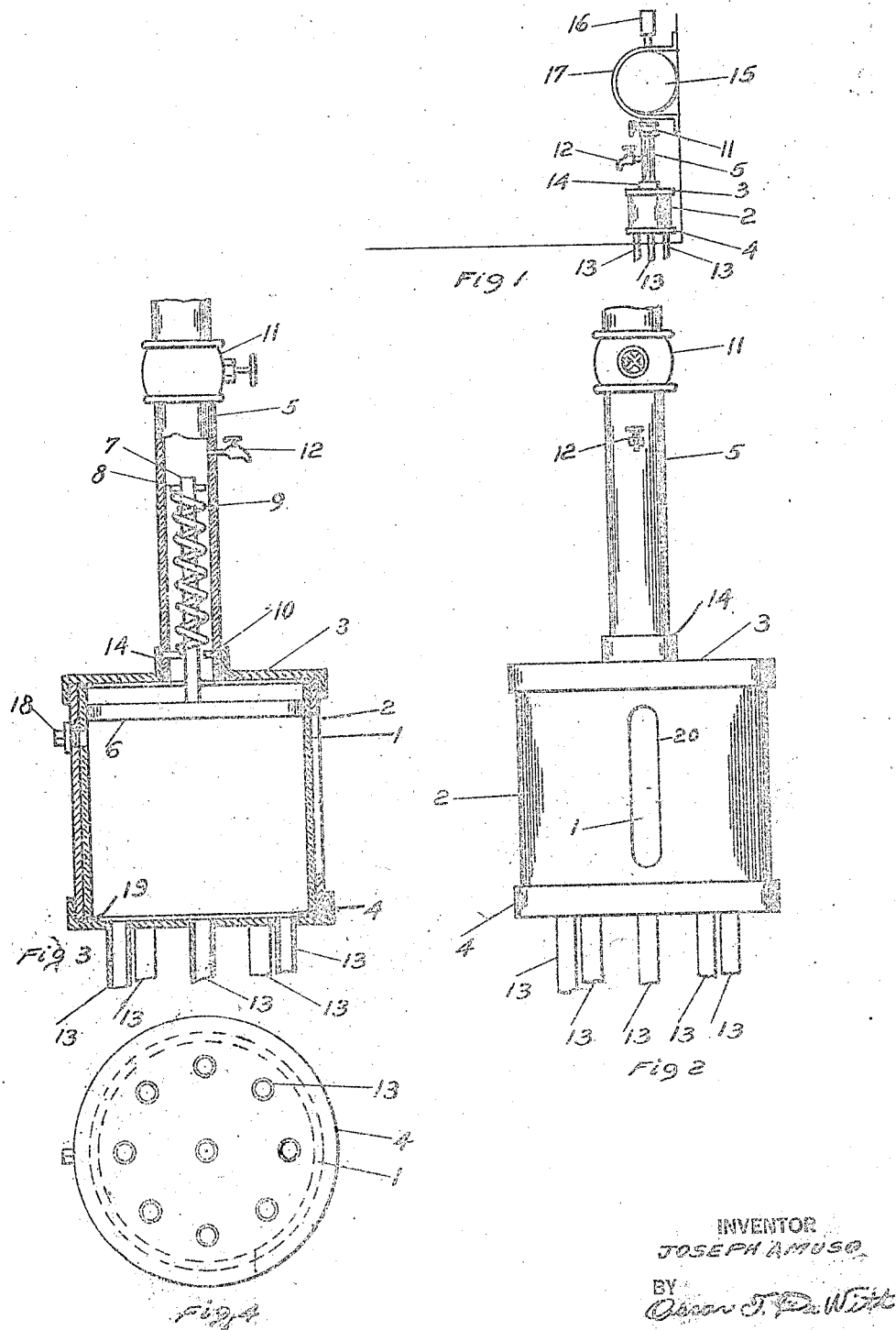

1,548,814

UNITED STATES PATENT OFFICE.

JOSEPH AMUSO, OF PITTSFIELD, MASSACHUSETTS.

LUBRICATOR.

Application filed November 22, 1924. Serial No. 751,708.

*To all whom it may concern:*

Be it known that I, JOSEPH AMUSO, a citizen of the United States, residing in Pittsfield, in the county of Berkshire and State of Massachusetts, have invented certain new and useful Improvements in Lubricators, of which the following is a specification, reference being had therein to the accompanying drawings.

My invention relates to means for oiling or lubricating journals and other bearings, and provides a system whereby one or more journals or bearings may be supplied with a lubricant, and operated by means of a pressure system.

Another object of the device is to provide means whereby the pressure on the lubricant reservoir may be released and the reservoir refilled with the lubricant material.

Figure 1 represents a side elevation of the device. Figure 2 is an elevation view of the lubricant reservoir. Figure 3 is a vertical section through the reservoir and pressure supply pipe, and Figure 4 is a bottom view of Figure 2 showing the arrangement of the tubes.

Referring to the drawings by numerals, 1 designates a cylindrical reservoir of suitable material, preferably glass, which may be of any size, and the said reservoir is mounted within the casing 2.

The casing 2 is provided with a screw cover 4 on the bottom, and the upper part of the reservoir is also provided with a screw cover 3. A gasket 19, of suitable material, is placed between the reservoir and the upper and lower covers thereby assuring an air tight enclosure within the reservoir. The lower cover 4 is provided with a plurality of tubes 13 to provide means to carry the lubricant to the various journals and bearings. The top cover is also provided with a projection 14 to provide means to connect the pressure supply pipe 5. The pressure supply pipe 5 is provided with a globe valve 11 and also a cock 12.

A piston 6 is slidably fitted in the reservoir and is operated by means of the pressure from the pressure supply pipe 5. The piston rod 7 is provided with a pin 8 to provide means to hold the spring 9 in position. The lower end of the pressure supply pipe is also provided with two pins 10 to provide supporting means for the spring 9.

As a means to ascertain the amount of lubricant within the reservoir, I have provided a slot 20 in the outer casing 2, and the reservoir proper consisting of some transparent material, it will be seen that the amount of lubricant in the reservoir can be readily ascertained. The reservoir may be filled at any time by removing the screw plug 18.

A pressure reservoir 15 is placed above or along side of the lubricator and fastened by a brace 17 or other means. The pressure reservoir is also provided with a pressure gauge 16. This reservoir provides the means whereby the lubricant is forced through the tubes 13.

The device is operated as follows: The reservoir is filled with lubricant and the tubes 13 are carried to the various journals and bearings. If necessary the tubes may be equipped with valves to regulate the supply, or the number of tubes to be used. The globe valve 11 is opened and the air pressure from the reservoir 15 passes through the pressure supply pipe 5, and the air being under pressure is exerted on the piston 6 and forces the piston in a downward position in the reservoir cylinder, and this action forces the lubricant through the tubes. The pressure on the piston, which causes it to move along the reservoir also compresses the spring 9.

After the piston 6 has traveled to the lower end of the reservoir cylinder, and it is desired to refill the reservoir with lubricant, the globe valve 11 is closed and the cock 12 is opened releasing the air within the reservoir and the pressure supply pipe 5. When the air pressure is released the tension on the spring 9 will cause the piston 6 to resume its original position.

It will be seen that the peculiar construction of my invention makes it readily adaptable to oil or grease the journals and bearings on an automobile, and by using hot air in the pressure reservoir the oil and grease in the lubricator may be maintained in a state that will cause it to freely flow through the tubes 13.

Having thus described my invention, what I claim, and desire to secure by Letters Patent, is:—

1. The combination with a pressure reservoir; a lubricant reservoir comprising a transparent inner cylinder, an outer protective cylinder surrounding said inner cylinder and provided with a slot, covers for the top and bottom of said cylinders, and necessary gaskets between said cylinders and said covers; a plurality of tubes extending from said bottom cover, a hollow projection extending from the said top cover, a pipe fitted into said hollow projection and connected to said pressure reservoir, means in said pipe for opening and closing the passage therethrough, a piston within the said lubricant reservoir, a rod extending from said piston, a coil spring placed over said rod, means to hold said spring in position, means to release the pressure on the lubricant piston, and means to refill the said reservoir.

2. The combination with a pressure reservoir; a lubricant reservoir comprising a transparent inner cylinder, an outer protective cylinder surrounding said inner cylinder and provided with a slot, covers for the top and bottom of said cylinders, and necessary gaskets between said cylinders and said covers; a plurality of tubes extending from said bottom cover, a hollow projection extending from the said top cover, a pipe fitted into said hollow projection and connected to said pressure reservoir, means in said pipe for opening and closing the passage therethrough, a piston within the said lubricant reservoir, a rod extending from said piston, the same being provided with a pin near the top, a coil spring placed over the said rod, and held in position by means of the pins in the pressure supply pipe and the said pin near the top of the rod, means to release the pressure on the lubricant piston, and means to refill the said lubricant reservoir.

In testimony whereof I affix my signature.

JOSEPH AMUSO.